Sept. 9, 1941.    C. L. HARVEY    2,255,286
LOCK NUT
Filed March 23, 1940

INVENTOR.
BY  CARL L. HARVEY
     Kwis Hudson Kent
                  ATTORNEYS

Patented Sept. 9, 1941

2,255,286

UNITED STATES PATENT OFFICE 2,255,286

LOCK NUT

Carl L. Harvey, Kent, Ohio, assignor to The Lamson & Sessions Company, Cleveland, Ohio, a corporation of Ohio Application March 23, 1940, Serial No. 325,596

3 Claims. (Cl. 151—21)

This invention relates to lock nuts, and more particularly to an improved lock nut of the type having an integral extension portion adapted to resiliently grip a threaded member when the nut is screwed thereon.

I am aware that lock nuts of this general type have heretofore been proposed and constructed, but such as have come to my attention have been unsatisfactory because of certain faults which the present invention seeks to overcome. In some of these nuts the extension portion has a permanent distortion to cause a resilient gripping of the threaded member and is formed with one or more slots or openings therein which extend through the wall and interrupt the thread of the tapped opening. These thread interruptions often have sharp corners or irregular portions which score or otherwise mutilate the thread of the threaded member onto which the nut is screwed. Nuts of this type have also been found to be unsatisfactory because the distorted extension portion loses its ability to grip the threaded member after a relatively small number of applications. As will be explained more in detail hereinafter, my improved lock nut overcomes these difficulties and can be repeatedly applied to a threaded member without material lessening of the locking effect thereon and without scoring or mutilation of the thread of such threaded member.

It may, therefore, be said to be an object of this invention to provide an improved lock nut of the type having a reduced integral extension for gripping the threaded member to which the nut is applied and in which such reduced extension is so constructed as to enable the nut to be repeatedly applied to the threaded member without material lessening of the gripping or locking effect thereon and which will not score or mutilate the threads of the threaded member.

Another object of my invention is to provide an improved lock nut of the type mentioned which is of very simple form and can be economically produced.

Other objects and advantages of my invention will be apparent from the following description and the accompanying drawing in which, Fig. 1 is a side elevation of a lock nut constructed according to my invention;

Figure 1:
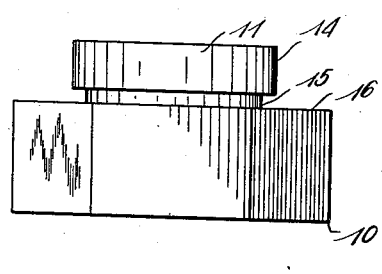

Further reference will now be made to the accompanying drawing for the purpose of describing my improved lock nut more in detail and although I have illustrated but one embodiment, it will be understood, of course, that the invention includes all other lock nuts and modifications thereof coming within the scope of the appended claims.

The lock nut shown in the drawing comprises a nut body 10 having an integral axial projection 11 of relatively reduced size on one end thereof, and an opening 12 extending through the nut body and projection and provided with a continuous or uninterrupted helical thread 13. The nut body 10 may comprise a polygonal shaped body of metal, such as the hexagonal body shown in this instance.

The axial extension 11 is of relatively reduced size as compared with the hexagonal nut body 10 and may include a resilient ring portion 14 which is formed on such extension and separated or partially isolated from the nut body by an external annular groove 15 formed in the axial extension adjacent the end face 16 of the nut body. This groove is, at all points therearound, of less depth than the thickness of the wall of the axial extension. In other words, the axial extension 11 has an external annular groove 15 cut or otherwise formed therein adjacent the point of connection of the extension with the nut body and which groove does not at any point break into the threaded opening 12.

Figure 2:
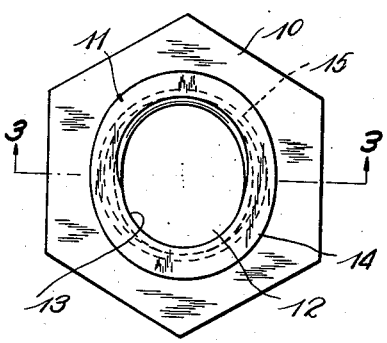
Fig. 2 is an end view thereof.

To enable my improved lock nut to grip the threaded member onto which it is to be screwed, I flatten or distort the ring portion 14 to an out-of-round or substantially elliptical shape, as shown in Fig. 2. When the nut is screwed onto a threaded member, the distorted ring portion 14 will be stressed or flexed as the threaded member passes therethrough and tends to expand the ring portion to circular form. This will result in the ring portion exerting a tight frictional grip on the threaded member which will serve to retain or lock the nut thereon sufficiently tight to prevent accidental loosening but not too tight to prevent the nut from being removed by means of a suitable wrench.

Figure 3:
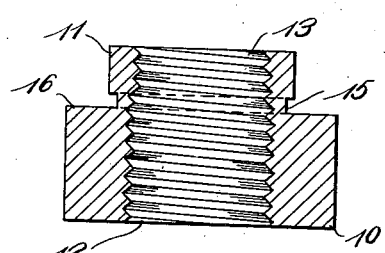
Fig. 3 is a longitudinal sectional view taken through the nut as indicated by line 3—3 of Fig. 2.

By constructing my improved lock nut with the integral locking extension thereof in the form of a ring which is separated or partially isolated from the nut body by the external annular groove 15, as above explained, it will be seen that this ring portion can be readily flattened or distorted to the desired elliptical shape without affecting or distorting the nut body or the thread convolutions thereof. In this flattening operation opposite sides of the reduced portion 11 above the groove 15 are moved bodily inward, as will be seen in Fig. 3, so that all the thread convolutions thereof have a nut locking or gripping action when the nut is screwed on a bolt. That is to say, the tops of those portions of the thread convolutions corresponding with the opposed flattened portions of the projection 11 lie in lines which are substantially parallel to the axis of the nut but are closer to such axis than similar lines extending through the tops of the thread convolutions of the body portion of the nut. It will also be seen that since the external annular groove 15 does not at any point break into the threaded opening 12, the thread 13 will not be interrupted and, therefore, will not have any abrupt shoulders or irregularities which would score or mutilate the threaded member when the nut is screwed thereon. Furthermore, it will be seen that by making the axial extension in the form of a ring portion which is partially isolated from the nut body as above explained, this ring portion can contain a sufficient body of metal to provide adequate strength in this portion of the article and yet enables the locking portion to readily yield independently of the nut body when the nut is applied to or removed from a threaded member. I find that a lock nut of the construction above described can be repeatedly applied to a threaded member and that for numerous applications subsequent to the first, no substantial lessening of the gripping or locking effect on the threaded member is noticeable.

My improved lock nut may be constructed in various ways, for example, it may be made by cutting a length or section from a bar of hexagonal stock and turning or otherwise cutting away the metal at one end of the section to thereby form the reduced extension 11 and the external annular groove 15. The nut body and extension can be drilled and tapped to provide the threaded opening 13 therethrough after which the ring portion 14 can be flattened or distorted by pressure suitably applied transversely of the nut axis. The nut can be heat-treated either before or after the distorting of the ring portion, or both, and such heat treatment can be either a hardening or an annealing of the metal, depending upon the resiliency, toughness and other characteristics desired in the metal of the finished nut.

From the foregoing description and the accompanying drawing, it will now be readily understood that I have provided an improved lock nut which can be economically produced and which can be repeatedly applied to a threaded member without material lessening of the locking effect thereon and without scoring or mutilation of the threads of the member on which the lock nut is screwed.

While I have illustrated and described my improved lock nut in a more or less detailed manner, it will be understood, of course, that I do not wish to be limited to precisely the form of lock nut herein disclosed, but regard my invention as including such changes and modifications as do not constitute a departure from the spirit of the invention and the scope of the appended claims.

Having thus described my invention, I claim:

1. A lock nut comprising a polygonal body portion and a ring portion of relatively reduced size formed as an integral extension on one end of said body portion and having an external annular groove therein adjacent its connection with the body portion, said body and ring portions having an axial opening therethrough provided with a continuous helical thread and said ring portion having opposite sides thereof moved bodily inward so that all thread convolutions thereof will lockingly grip a threaded member when the nut is applied thereto.

2. A lock nut comprising a nut body having an integral projection of relatively reduced size on one end thereof and an opening extending through the body and projection and provided with a continuous helical thread, said projection comprising a ring portion separated from said body by an external annular groove formed in said projection and which at all points therearound is of less depth than the thickness of the wall of said projection, said ring portion being resilient and having opposite sides thereof moved bodily inward so that all thread convolutions thereof will lockingly grip a threaded member when screwed thereon.

3. A lock nut comprising a nut body having an integral projection of relatively reduced size on one end thereof and an opening extending through the body and projection and provided with a continuous helical thread, said projection comprising a ring portion separated from said body by an external annular groove formed in said projection and which at all points therearound is of less depth than the thickness of the wall of said projection, said ring portion being resilient and being flattened and moved bodily inward at substantially opposed points so that the tops of the corresponding portions of all of the thread convolutions thereof lie in lines which are substantially parallel to the axis of the nut but are closer to such axis than similar lines extending through the tops of the thread convolutions of the body portion of the nut and said convolutions of the ring portion all being thus adapted to lockingly grip a threaded member when the nut is screwed thereon.

CARL L. HARVEY.